(12) United States Patent
Sweeney et al.

(10) Patent No.: US 11,376,789 B2
(45) Date of Patent: *Jul. 5, 2022

(54) THREE DIMENSIONAL PRINTER APPARATUS

(71) Applicant: Essentium, Inc., Pflugerville, TX (US)

(72) Inventors: Charles Brandon Sweeney, Pflugerville, TX (US); Travis Eubanks, San Antonio, TX (US); Alex Stockton, Pflugerville, TX (US); Blake Teipel, Pflugerville, TX (US)

(73) Assignee: Essentium, Inc., Pflugerville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/614,600

(22) PCT Filed: May 18, 2018

(86) PCT No.: PCT/US2018/033409
§ 371 (c)(1),
(2) Date: Nov. 18, 2019

(87) PCT Pub. No.: WO2018/213718
PCT Pub. Date: Nov. 22, 2018

(65) Prior Publication Data
US 2020/0070416 A1    Mar. 5, 2020

Related U.S. Application Data

(60) Provisional application No. 62/508,464, filed on May 19, 2017.

(51) Int. Cl.
*B29C 64/209* (2017.01)
*H05B 6/14* (2006.01)
*B33Y 30/00* (2015.01)

(52) U.S. Cl.
CPC ........... *B29C 64/209* (2017.08); *H05B 6/14* (2013.01); *B33Y 30/00* (2014.12)

(58) Field of Classification Search
CPC ..... B29C 64/209; B29C 64/118; B29C 64/10; B29C 64/20; B29C 64/30; B33Y 30/00;
(Continued)

(56) References Cited

U.S. PATENT DOCUMENTS

| 2,542,589 A | 2/1951 | Stanton et al. |
| 3,831,985 A | 8/1974 | Oostenbrink |

(Continued)

FOREIGN PATENT DOCUMENTS

| CN | 104395032 A | 3/2015 |
| CN | 104708828 | 6/2015 |

(Continued)

OTHER PUBLICATIONS

Wikipedia "Alternating Current" Dec. 18, 2016 (Dec. 18, 2016) p. 1 para[0002]; Retrieved from https:1/en.wikipedia.org/wlindex.phptitle=Alternating_current oldid= 755493680 on Aug. 24, 2018 (Aug. 24, 2018).

(Continued)

*Primary Examiner* — Joseph S Del Sole
*Assistant Examiner* — Ariella Machness
(74) *Attorney, Agent, or Firm* — Vivacqua Crane, PLLC

(57) ABSTRACT

A three-dimensional printing apparatus for manufacturing a three-dimensional object includes a controller and a three-dimensional printer. The controller has a signal generator. The three-dimensional printer includes a print head, a part carrier, and a plasma field applicator. The plasma field applicator is disposed on an end of the print head. The controller is in communication with the print head, part carrier, and plasma field applicator. The three dimensional printer builds the three-dimensional object onto the part (Continued)

carrier. The signal generator outputs a signal to the plasma field applicator and the plasma field applicator generates an electromagnetic field and induced current pathway incident to the three-dimensional object on the part carrier.

17 Claims, 6 Drawing Sheets

(58) Field of Classification Search
CPC ...... B33Y 10/00; B33Y 40/00; B23K 10/027; B23K 10/02; H05B 6/14
See application file for complete search history.

(56) References Cited

U.S. PATENT DOCUMENTS

| | | | |
|---|---|---|---|
| 5,338,497 | A | 8/1994 | Murray et al. |
| 5,807,437 | A | 9/1998 | Sachs et al. |
| 6,649,888 | B2 | 11/2003 | Ryan et al. |
| 6,812,445 | B2 | 11/2004 | Gorbold |
| 7,725,209 | B2 | 5/2010 | Menchik et al. |
| 9,662,840 | B1 | 5/2017 | Buller et al. |
| 10,513,080 | B2 | 12/2019 | Kim et al. |
| 2002/0079121 | A1 | 6/2002 | Ryan et al. |
| 2003/0199251 | A1 | 10/2003 | Gorbold |
| 2010/0292757 | A1 | 11/2010 | Ehlbeck et al. |
| 2011/0134170 | A1 | 6/2011 | Addy |
| 2012/0164256 | A1 | 6/2012 | Swanson et al. |
| 2014/0265037 | A1 | 9/2014 | Stirling et al. |
| 2014/0361464 | A1 | 12/2014 | Holcomb |
| 2015/0042017 | A1 | 2/2015 | Ramaswamy et al. |
| 2015/0053656 | A1 | 2/2015 | Popp et al. |
| 2015/0140158 | A1 | 5/2015 | Cervantes et al. |
| 2015/0273582 | A1 | 10/2015 | Crump et al. |
| 2015/0291833 | A1 | 10/2015 | Kunc et al. |
| 2015/0360427 | A1 | 12/2015 | Shah et al. |
| 2016/0016369 | A1 | 1/2016 | Tarbutton et al. |
| 2016/0096327 | A1 | 4/2016 | Fry et al. |
| 2016/0271874 | A1* | 9/2016 | Tsai ........................ B33Y 10/00 |
| 2016/0288414 | A1 | 10/2016 | Ozbolat et al. |
| 2016/0312037 | A1 | 10/2016 | Zhao et al. |
| 2016/0318248 | A1 | 11/2016 | Susnjara et al. |
| 2016/0325487 | A1 | 11/2016 | Miller |
| 2016/0368054 | A1* | 12/2016 | Ng ........................ B29C 64/153 |
| 2016/0375491 | A1* | 12/2016 | Swaminathan ........ B33Y 30/00 419/53 |
| 2017/0151704 | A1 | 6/2017 | Go et al. |
| 2017/0203363 | A1* | 7/2017 | Rowland .............. B23K 10/027 |
| 2017/0268130 | A1* | 9/2017 | Wu ........................ B33Y 50/02 |
| 2017/0341183 | A1 | 11/2017 | Buller et al. |
| 2018/0132157 | A1 | 5/2018 | Yang |
| 2018/0370141 | A1 | 12/2018 | Eller et al. |
| 2019/0256962 | A1 | 8/2019 | Kobayashi et al. |
| 2019/0344502 | A1 | 11/2019 | Sweeney et al. |
| 2019/0375156 | A1 | 12/2019 | Knox |
| 2020/0335303 | A1 | 10/2020 | Gandhiraman et al. |

FOREIGN PATENT DOCUMENTS

| | | | |
|---|---|---|---|
| CN | 106029333 | A | 10/2016 |
| CN | 106041080 | A | 10/2016 |
| CN | 108248043 | A | 7/2018 |
| EP | 3526290 | A1 | 8/2019 |
| KR | 101672757 | B1 * | 11/2016 |
| WO | 2013152805 | A1 | 10/2013 |
| WO | 2015147939 | A1 | 10/2015 |
| WO | 2015191757 | A1 | 12/2015 |
| WO | 2016051163 | A1 | 4/2016 |
| WO | 2016060703 | A1 | 4/2016 |
| WO | 2016154103 | A1 | 9/2016 |
| WO | 2017210490 | A1 | 12/2017 |
| WO | 2018132157 | A2 | 7/2018 |
| WO | 2018156458 | A1 | 8/2018 |
| WO | 2018213718 | A1 | 11/2018 |

OTHER PUBLICATIONS

Rouse "Ground" Mar. 15, 2010 (Mar. 15, 2010) p. 1 para[0002]; Retrieved from https:1/whatis.techtarget.com/definition/ground on Aug. 24, 2018 (Aug. 24, 2018).
International Search Report and Written Opinion in PCT/US18/33409, International Searching Authority WIPO, dated Sep. 17, 2018.
Gannon, Christopher J., et al. "Carbon nanotube-enhanced thermal destruction of cancer cells in a noninvasive radiofrequency field." Cancer 110.12 (2007): 2654-2665.
Moran, Christine H., et al. "Size-dependent joule heating of gold nanoparticles using capacitively coupled radiofrequency fields." Nano Research 2.5 (2009): 400-405.
1st Office Action, China National Intellectual Property Administration, dated Jan. 5, 2021.
Extended European Search Report, European Patent Office, dated Dec. 3, 2020.
China National Intellectual Property Administration. First Office Action for CN Application No. 201880013621X and English translation, dated Jan. 15, 2021, pp. 1-13.
European Patent Office. Extended European Search Report for EP Application No. 18756979.3, dated Sep. 17, 2020, pp. 1-9.
International Preliminary Report on Patentability in PCT/US18/18629, International Searching Authority WIPO dated May 24, 2019.
International Search Report and Written Opinion in PCT/US18/18629, International Searching Authority WIPO dated Apr. 9, 2018.
Plasma (physics)—Wikipedia_Dec. 31, 2016 (Year: 2016).

* cited by examiner

THREE DIMENSIONAL PRINTER APPARATUS

This application is a national stage completion of international application number PCT/US2018/033409, filed on May 18, 2018, which claims the benefit of the U.S. Provisional Application No. 62/508,464 filed May 19, 2017, the entire disclosures of which are hereby incorporated herein by reference.

FIELD

The invention relates to an apparatus and methods for producing three dimensional printed parts.

BACKGROUND

The statements in this section merely provide background information related to the present disclosure and may or may not constitute prior art.

Three Dimensional Printing or Additive Manufacturing represents several processes for creating three dimensional objects from a digital CAD design model. A three dimensional printed part is formed by stacking several two dimensional layers of material such that the end result is an object having length, width, and height. In several of the processes, materials used to form the objects can range from metal to thermoplastic and composite. However, while these processes are capable of quickly producing intricate parts including great detail, the current processes seem capable of producing objects having only very limited purposes. Such purposes include prototype parts, novelty objects, demonstration parts or assemblies, or parts having other light duty purposes. This limited use is mainly due to the ability of the additive assembly processes to produce parts having high cohesive strength between several two dimensional layers of the printed part.

Some process improvements include attempts to increase the cohesive strength between the layers of the three dimensional printed object. These attempts include in-process and post-process steps that involve different methods of heating the printed object such that the layers soften or even melt to promote cross-solidification or crystallization between the layers. However, heating the entire three dimensional part either in-process or post-process may result in distortion of the part through sagging and lingering residual stresses, among other defects.

While current three dimensional printers and processes achieve their intended purpose, there is a need for an improved three dimensional printer and process for providing parts for an increasing array of applications requiring improved strength, dimensional capability, and multi-functional purposes.

SUMMARY

The present disclosure includes a three-dimensional printing apparatus for manufacturing a three-dimensional object comprises a controller and a three-dimensional printer. The controller has a signal generator. The three-dimensional printer includes a print head, a part carrier, and a plasma field applicator. The plasma field applicator is disposed on an end of the print head. The controller is in communication with the print head, part carrier, and plasma field applicator. The three dimensional printer builds the three-dimensional object onto the part carrier. The signal generator outputs a signal to the plasma field applicator and the plasma field applicator generates an electromagnetic field and induced current pathway incident to the three-dimensional object on the part carrier.

In one example of the present invention, the signal output to the plasma field applicator comprises a high potential electromagnetic signal.

In another example of the present invention, the high potential electromagnetic signal comprises an alternating current signal having a frequency between approximately 10 kHz and 100 kHz.

In yet another example of the present invention, the high potential electromagnetic signal comprises one of a continuous wave signal, a square wave signal, a triangle wave signal, a short duration pulse signal, and a rectified signal.

In yet another example of the present invention, the plasma field applicator comprises a high voltage electrode and a dielectric insulator and the high voltage electrode encapsulated by the dielectric insulator.

In yet another example of the present invention, the high voltage electrode of the plasma field applicator is connected to the signal generator and the part carrier is grounded.

In yet another example of the present invention, the plasma field applicator has a disc-like shape.

In yet another example of the present invention, the print head is a pass through continuous feed stock print head nozzle.

In yet another example of the present invention, the print head is a screw-type extrusion print head nozzle.

In yet another example of the present invention, the print head includes a powder compaction roller.

The above features and advantages and other features and advantages of the present disclosure are readily apparent from the following detailed description when taken in connection with the accompanying drawings.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
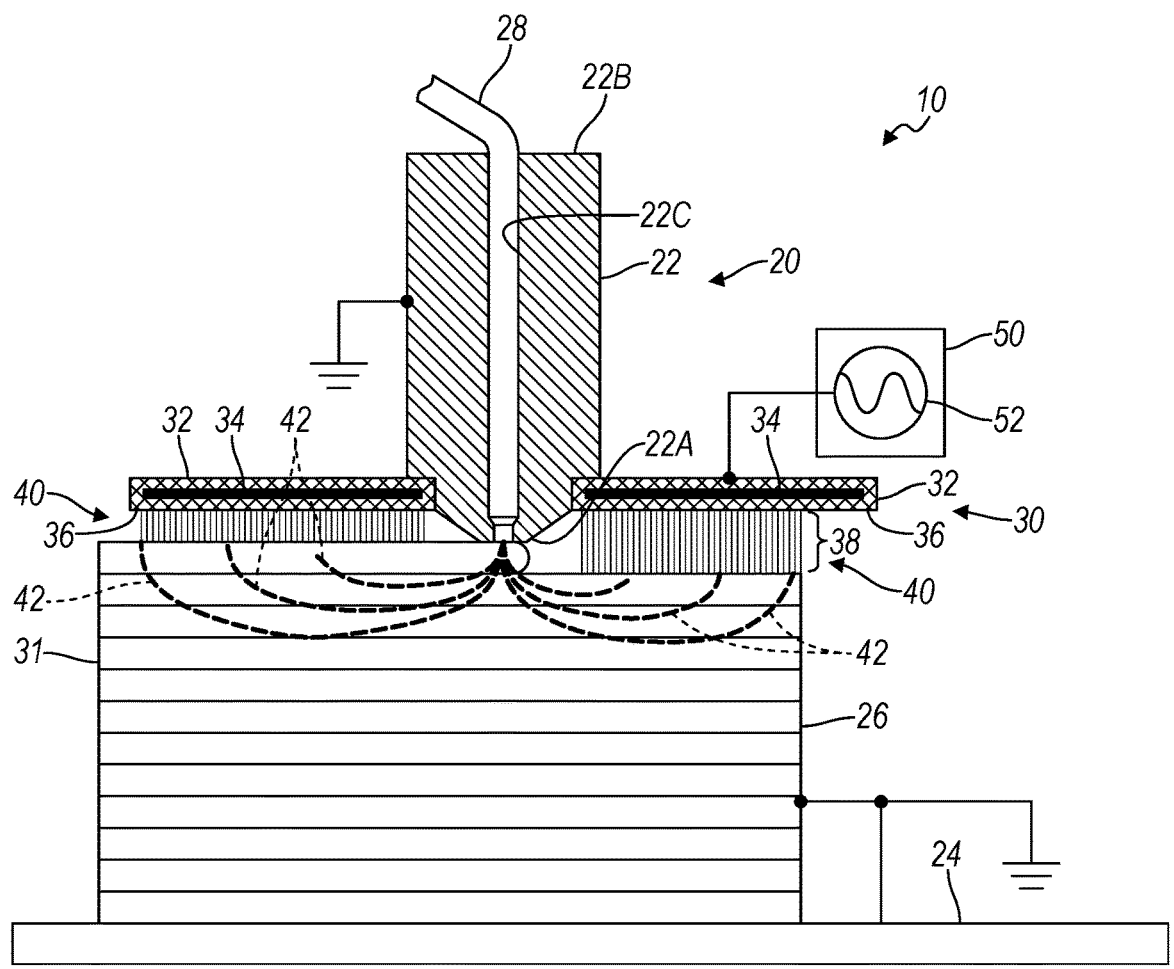
FIG. 1 depicts a three dimensional printing apparatus for executing a three dimensional printing process according to the principles of the present invention.

Referring to FIG. 1, a cross-section schematic of a three dimensional printing apparatus 10 is illustrated and will now be described. The three dimensional printing apparatus 10 includes a three dimensional printer 20, a plasma applicator apparatus 30, a controller 50, and an excitation signal. More particularly, the three dimensional printer 20 includes a print head nozzle 22, a part carrier 24, and a supporting structure such as a Cartesian gantry (not shown), a delta-style structure or a robotic arm (not shown) that supports the print head nozzle 22. The print head nozzle 22 is a pass through continuous feed stock print head nozzle 22 including a first end or nozzle tip 22A, a second end or feed end 22B, and a feedstock bore 22C. The print head nozzle 22 is vertically disposed in a housing (not shown).

A three dimensional part 26 is initiated and built upon the part carrier 24 as a filament 28 passes through the print head nozzle 22 and is deposited on the part carrier 24 or a previous layer 31 of the three dimensional part 26. One of or both the print head nozzle 22 and the part carrier 24 are capable of movement in the x, y, and z directions, or a combination of these directions composing circular or curved patters, for depositing the heated filament onto the previous layers 31 of the three dimensional part 26.

The plasma applicator apparatus 30 includes a plasma field applicator 32 and the part carrier 24. More particularly, the plasma field applicator 32 includes a high voltage electrode 34 encapsulated by a dielectric insulator 36. The plasma field applicator 32 is disc-shaped and disposed on the nozzle tip 22A of the print head nozzle 22 coaxially with the print head nozzle 22. The part carrier 24 grounds the three dimensional part 26 to complete a conduction pathway that includes the plasma field applicator 32, an air gap 38 between the three dimensional part 26 and the plasma field applicator 32, the grounded three dimensional part 26, and the part carrier 24. The printer nozzle 22 is also grounded. As layers of the three dimensional part 26 are fully or at least partially completed, the plasma field applicator 32 moves over the three dimensional part 26 or moves in sufficiently close proximity to the three dimensional part 26 placing the three dimensional part 26 under or incident with a plasma field 40 created by the plasma field applicator 32. The plasma field 40 completes the conduction pathway to directly couple the high voltage electrode 34 with the three dimensional part 26. An electromagnetic field and induced current pathway 42 is, in addition to the plasma field 40, produced by the plasma field applicator 32. The plasma field 40 conductively couples the high voltage electrode 34 to the three dimensional part 26 creating the electromagnetic field and induced current pathway 42 as shown emanating from the face of the plasma field applicator 32 traveling to the nozzle tip 22A of the print head nozzle 22.

The controller 50 is preferably an electronic control device having a preprogrammed digital computer or processor, control logic, memory used to store data, and at least one I/O peripheral. The control logic includes a plurality of logic routines for monitoring, manipulating, and generating data. The controller 50 controls the operation the three dimensional printer 20 and the plasma applicator apparatus 30. The control logic may be implemented in hardware, software, or a combination of hardware and software. For example, control logic may be in the form of program code that is stored on the electronic memory storage and executable by the processor. The controller 50 provides control signals, generated by special software that creates pathways for the nozzle based on specific cross-section geometry that comes from a CAD model data program, to the gantry, the print head nozzle 22, the plasma field applicator 32, and the part carrier 24 thus producing the three dimensional part 26. The controller may also modify the frequency, voltage, current, and waveform shape of the plasma.

A further feature of the controller 50 is a signal generator 52 that outputs a high potential electromagnetic signal to the plasma field applicator 32. The signal generator 52 preferably provides an alternating current signal between 10-100 kHz to eliminate radiation and maximize conduction heating efficiency. However, any signal frequency or waveform shape may be used, including but not limited to continuous waves, square waves, triangle waves, short duration pulses, and rectified signals.

Figure 2:
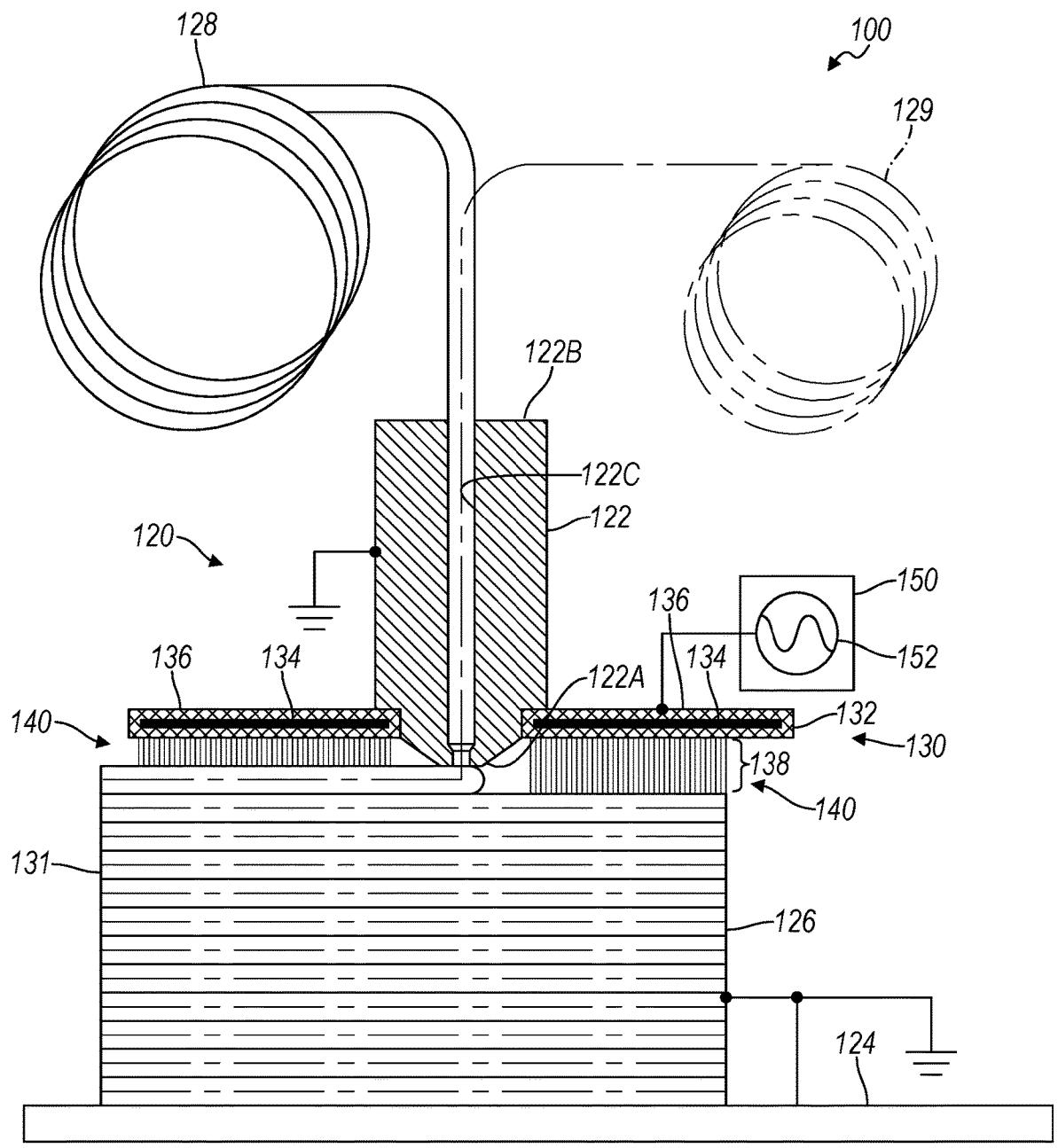
FIG. 2 depicts a three dimensional printing apparatus for executing a three dimensional printing process according to the principles of the present invention.

Referring now to FIG. 2, another example of a three dimensional printing apparatus 100 is illustrated and will now be described. The three dimensional printing apparatus 100 includes a three dimensional printer 120, a plasma applicator apparatus 130, and a controller 150. Specific to this example, the three dimensional printer 120 includes a printing head nozzle 122, a part carrier 124, and a supporting structure such as a Cartesian gantry (not shown), a delta-style structure or a robotic arm (not shown) that supports the printing head nozzle 122. As with the example shown in FIG. 1, the print head nozzle 122 includes a first end or nozzle tip 122A, a second end or feed end 122B, and a feedstock bore 122C. The print head nozzle 122 is vertically disposed in a housing (not shown).

A three dimensional part 126 is initiated and built upon the part carrier 124 as a polymer filament feedstock 128 and a fiber feedstock 129 combine as they each pass through the print head nozzle 122 and are deposited on the part carrier 124 or a previous layer 131 of the three dimensional part 126. One of or both of the print head nozzle 122 and the part carrier 124 are capable of movement in the x, y, and z directions, or a combination of these directions composing circular or curved patters, for depositing the heated filament 128 and the fiber feedstock 129 onto the previous layer 131 of the three dimensional part 126.

The plasma applicator apparatus 130 includes a plasma field applicator 132 and the part carrier 124. More particularly, the plasma field applicator 132 includes a high voltage electrode 134 encapsulated by a dielectric insulator 136. The part carrier 124 grounds the three dimensional part 126 to complete a conduction pathway that includes the plasma field applicator 132, an air gap 138 between the plasma field applicator 132 and the three dimensional part 126, the grounded three dimensional part 126, and the part carrier 124. The print head nozzle 122 is also grounded. As layers of the three dimensional part 126 are fully or at least partially completed, the plasma field applicator 132 moves over the three dimensional part 126 or moves in sufficiently close proximity to the three dimensional part 126 placing the three dimensional part 126 under or incident within a plasma field 140 created by the plasma field applicator 132. The plasma field 140 completes the conduction pathway to directly couple the high voltage electrode 134 with the three dimensional part 126. An electromagnetic field and induced current pathway 42, as shown in FIG. 1, is produced by the plasma field applicator 132. The plasma field 140 conductively couples the high voltage electrode 134 to the three dimensional part 126 creating the electromagnetic field and induced current pathway 42, as shown in FIG. 1, emanating from the face of the plasma field applicator 132 traveling to the nozzle tip 122A of the print head nozzle 122.

Figure 3:
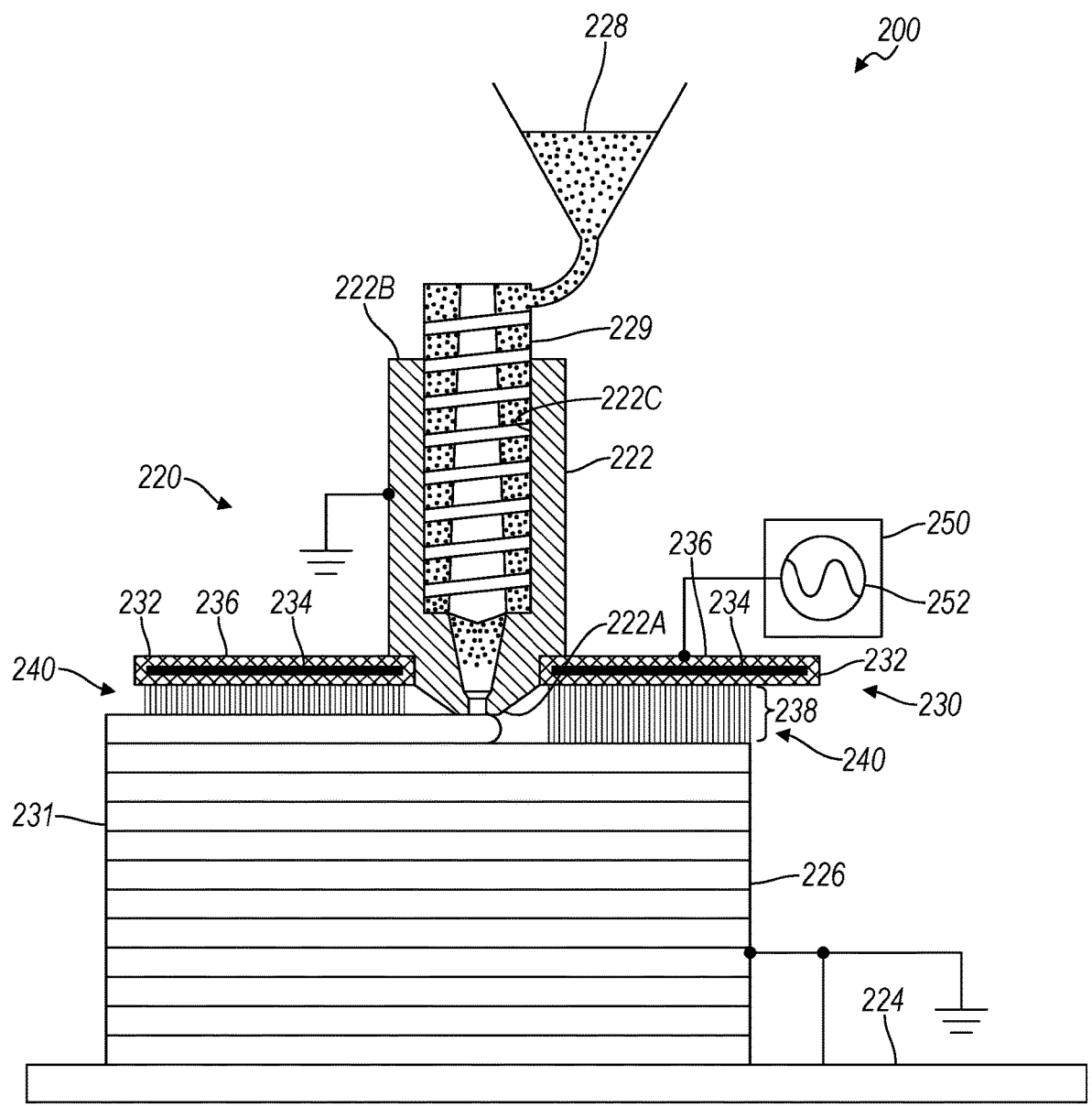
FIG. 3 depicts a three dimensional printing apparatus for executing a three dimensional printing process according to the principles of the present invention.

Referring now to FIG. 3, another example of a three dimensional printing apparatus 200 is illustrated and will now be described. The three dimensional printing apparatus 200 includes a three dimensional printer 220, a plasma applicator apparatus 230, and a controller 250. Specific to this example, the three dimensional printer 220 includes a print head nozzle 222, a part carrier 224, and a supporting structure such as a Cartesian gantry (not shown), a delta-style structure or a robotic arm (not shown) that supports the print head nozzle 222. The print head nozzle 222 is a screw-type print head nozzle 222 using a powdered or bulk feed material and includes a first end or nozzle tip 222A, a second end or feed end 222B, and an extrusion bore 222C. The print head nozzle 222 is vertically disposed in a housing (not shown).

A three dimensional part 226 is initiated and built upon the part carrier 224 as a polymer pellet feedstock 228 is fed through the print head nozzle 222 using a extrusion feeder screw 229 and deposited on the part carrier 224 or a previous layer 231 of the three dimensional part 226. One of or both of the print head 222 and the part carrier 224 are capable of movement in the x, y, and z directions, or a combination of these directions composing circular or curved patters, for depositing the heated filament onto the previous layers of the three dimensional part 226.

The plasma applicator apparatus 230 includes a plasma field applicator 232 and the part carrier 224. More particularly, the plasma field applicator 232 includes a high voltage electrode 234 encapsulated by a dielectric insulator 236. The part carrier 224 grounds the three dimensional part 226 to complete a conduction pathway that includes the plasma field applicator 232, an air gap 238 between the plasma field applicator 232 and the three dimensional part 226, the grounded three dimensional part 226, and the part carrier 224. The print head nozzle 222 is also grounded. As layers of the three dimensional part 226 are fully or at least partially completed, the plasma field applicator 232 moves over the three dimensional part 226 or moves in sufficiently close proximity to the three dimensional part 226 placing three dimensional part 226 under or incident within a plasma field 240 created by plasma applicator 232. The plasma field 240 completes the conduction pathway to directly couple the high voltage electrode 234 with the three dimensional part 226. An electromagnetic field and induced current pathway 42, as shown in FIG. 1, is produced by the plasma field applicator 232. The plasma field 240 conductively couples the potential high voltage electrode 234 to the three dimensional part 226 creating the electromagnetic field and induced current pathway 42, as shown in FIG. 1, emanating from the face of the plasma field applicator 232 traveling to the nozzle tip 222A of the print head nozzle 222.

Figure 4:
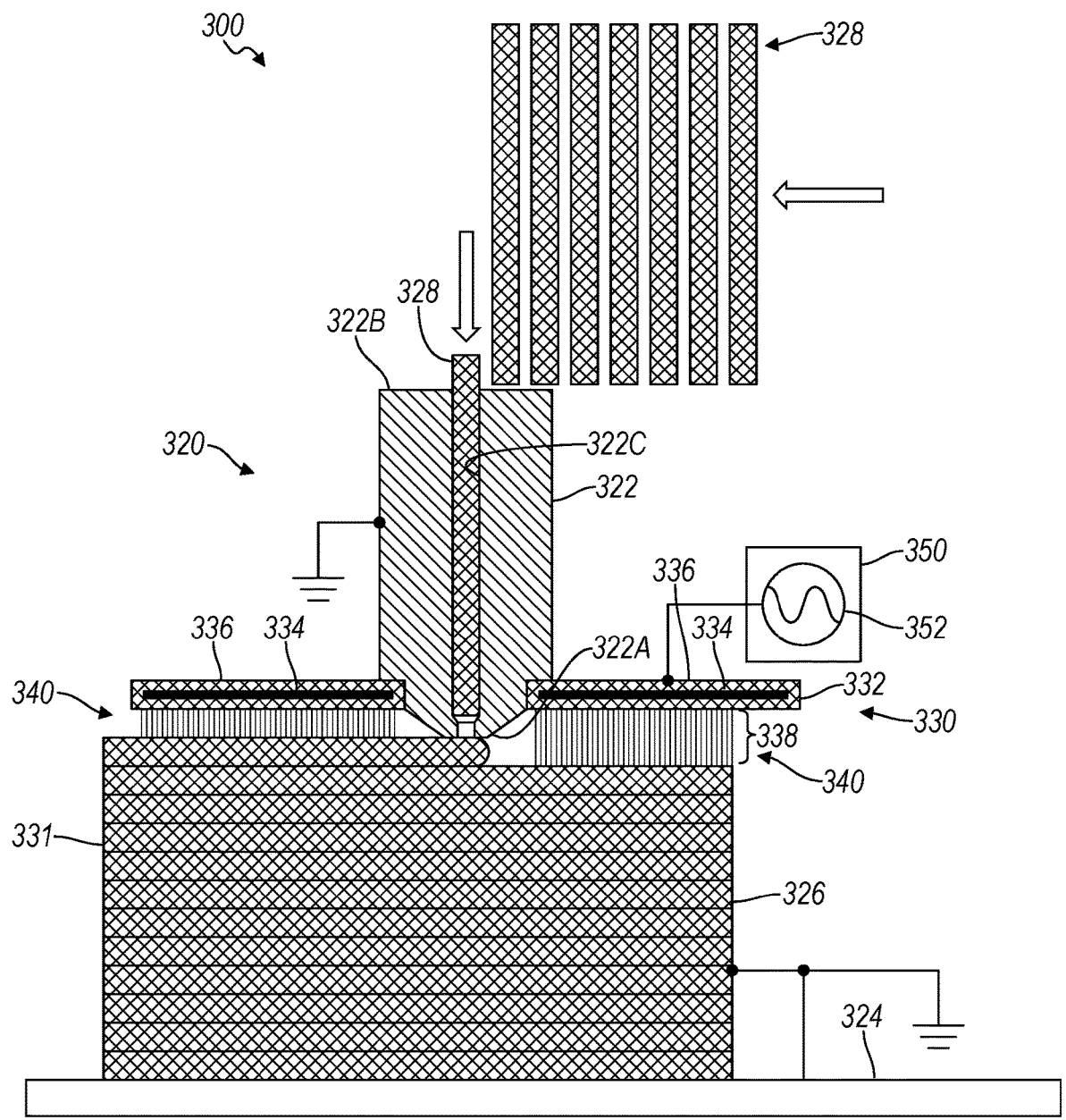
FIG. 4 depicts a three dimensional printing apparatus for executing a three dimensional printing process according to the principles of the present invention.

Referring now to FIG. 4, another example of a three dimensional printing apparatus 300 is illustrated and will now be described. The three dimensional printing apparatus 300 includes a three dimensional printer 320, a plasma applicator apparatus 330, and a controller 350. Specific to this example, the three dimensional printer 320 includes a printing head nozzle 322, a part carrier 324, and a supporting structure such as a Cartesian gantry (not shown), a delta-style structure or a robotic arm (not shown) that supports the print head nozzle 322. The print head nozzle 322 includes a first end or nozzle tip 322A, a second end or feed end 322B, and a feedstock bore 322C. The print head nozzle 322 is vertically disposed in a housing (not shown).

A three dimensional part 326 is initiated and built upon the part carrier 324 as a metal composite rod feed stock 328 is fed through the printing head nozzle 322 causing the metal composite rod feed stock 328 to melt and deposit the melted metal composite on the part carrier 324 or a previous layer 331 of the three dimensional part 326. One of or both of the print head 322 and the part carrier 324 are capable of movement in the x, y, and z directions, or a combination of these directions composing circular or curved patters, for depositing the heated filament onto the previous layers of the three dimensional part 326.

The plasma applicator apparatus 330 includes a plasma field applicator 332 and the part carrier 324. More particularly, the plasma field applicator includes a high voltage electrode 334 encapsulated by a dielectric insulator 336. The part carrier 324 grounds the three dimensional part 326 to complete a conduction pathway that includes the plasma field applicator 332, an air gap 338 between the plasma field applicator 332 and the three dimensional part 326, the grounded three dimensional part 326, and the part carrier 324. The print head nozzle 322 is also grounded. As layers of the three dimensional part 326 are fully or at least partially completed, the plasma field applicator 332 moves over the three dimensional part 326 or moves in sufficiently close proximity to the three dimensional part 326 placing three dimensional part 326 under or incident within a plasma field 340 created by the plasma field applicator 332. The plasma field 340 completes the conduction pathway to directly couple the high voltage electrode 334 with the three dimensional part 326. An electromagnetic field and induced current pathway 42, as shown in FIG. 1, is produced by the plasma field applicator 330. The plasma field 340 conductively couples the potential high voltage electrode 334 to the three dimensional part 326 creating the electromagnetic field and induced current pathway 42 as shown emanating from the face of the plasma field applicator 332 traveling to the nozzle tip 322A of the print head nozzle 322.

Figure 5:
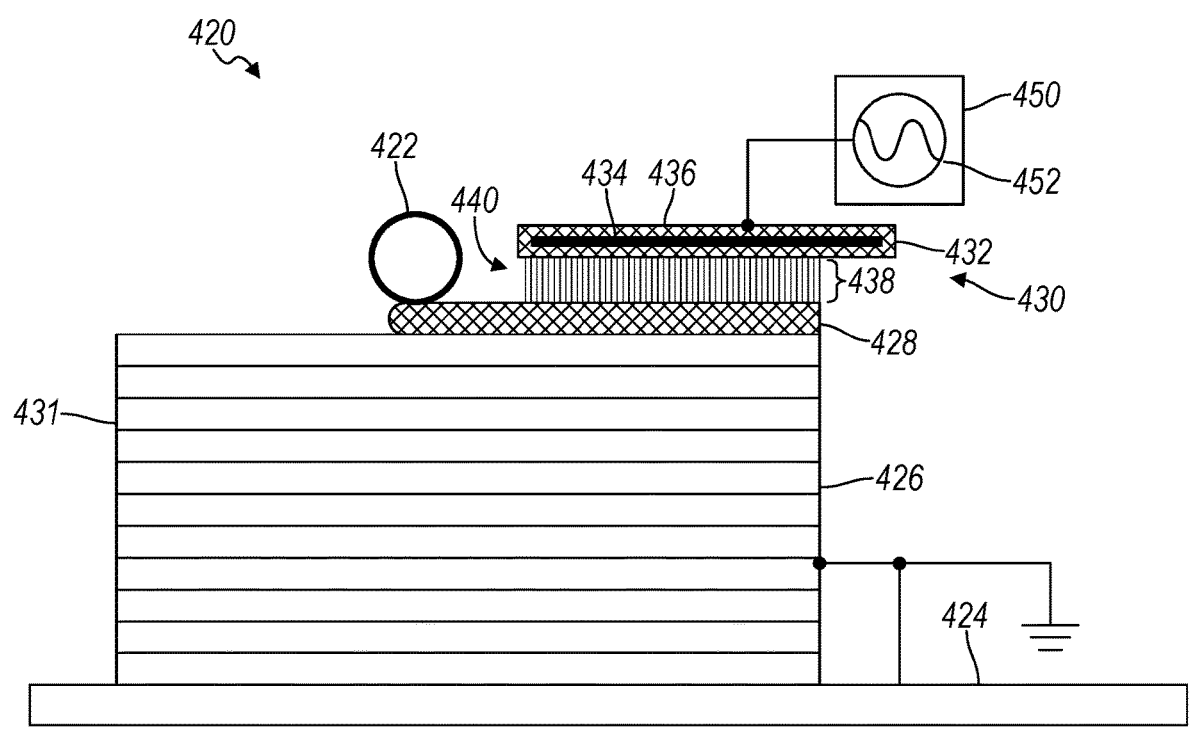
FIG. 5 depicts a three dimensional printing apparatus for executing a three dimensional printing process according to the principles of the present invention.
Figure 6:
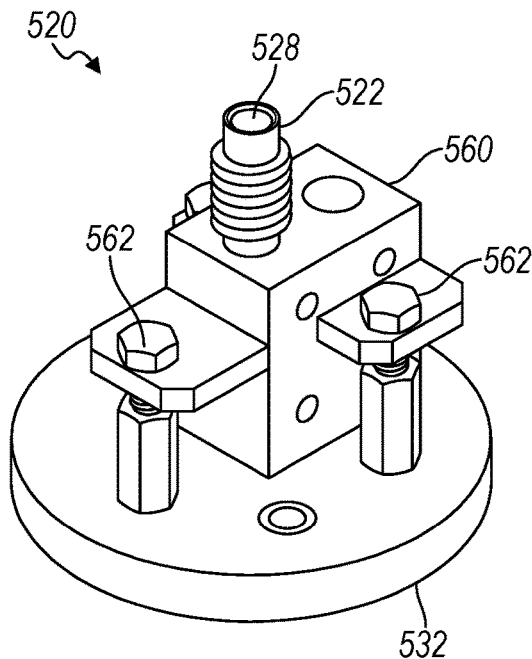
FIG. 6 is a perspective view of a printing head for a three dimensional printing apparatus according to the principles of the present invention.
Figure 7:
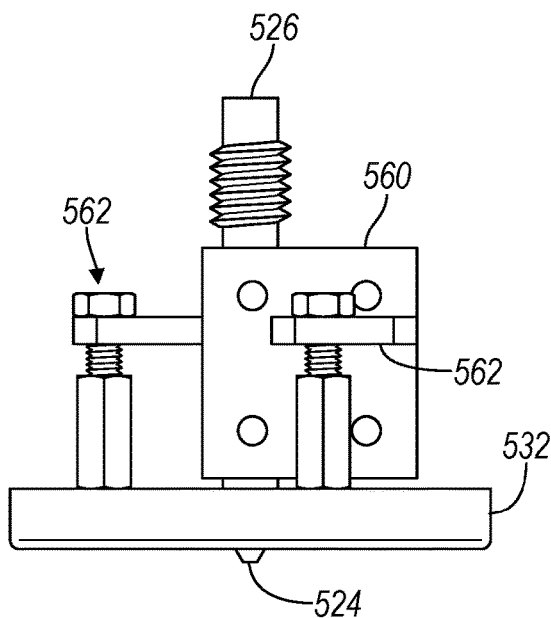
FIG. 7 is a side view of a printing head for a three dimensional printing apparatus according to the principles of the present invention.
Figure 8:
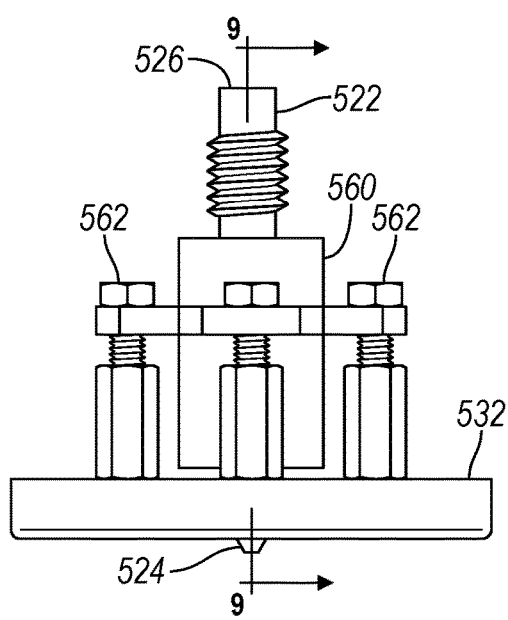
FIG. 8 is a front view of a printing head for a three dimensional printing apparatus according to the principles of the present invention.

Referring now to FIG. 5, another example of a three dimensional printing apparatus 400 is illustrated and will now be described. The three dimensional printing apparatus 400 includes a powder compaction type three dimensional printer 420, a plasma applicator apparatus 430, and a controller 450. Specific to this example, the three dimensional printer 420 includes a powder compaction roller 422, a part carrier 424, and a supporting structure such as a Cartesian gantry (not shown), a delta-style structure or a robotic arm (not shown) that supports the powder compaction roller 422. A three dimensional part 426 is initiated and built upon the part carrier 424 as powdered feedstock 428 is deposited on the part carrier 424 or a previous layer 431 of the three dimensional part 426. The powder compaction roller 422 applies pressure to the previously deposited layer of powdered feedstock 428 onto the prior layer 431. One of or both of the compaction roller 422 and the part carrier 424 are capable of movement in the x, y, and z directions, or a combination of these directions composing circular or curved patters, for depositing the heated filament onto the previous layers of the three dimensional part 426.

The plasma applicator apparatus 430 includes a plasma field applicator 432 and the part carrier 424. More particularly, the plasma field applicator 432 includes a high voltage electrode 434 encapsulated by a dielectric insulator 436. The part carrier 424 grounds the three dimensional part 426 to complete a conduction pathway that includes the plasma field applicator 432, an air gap 438 between the plasma field applicator 432 and the three dimensional part 426, the grounded three dimensional part 426, and the part carrier 424. As layers of the three dimensional part 426 are fully or at least partially completed, the plasma field applicator 432 moves over the three dimensional part or moves in sufficiently close proximity to the three dimensional part 426 placing three dimensional part 426 under or incident within a plasma field 440 created by the plasma field applicator 432. The plasma field 440 completes the conduction pathway to directly couple the high voltage electrode 434 with the three dimensional part 426. An electromagnetic field and induced current pathway 42, as shown in FIG. 1, is produced by the plasma field applicator 430. The plasma field 440 conductively couples the potential high voltage electrode 434 to the three dimensional part 426 creating the electromagnetic field and induced current pathway emanating from the high voltage electrode 434 and traveling to the compaction roller 422 and/or to the grounded part carrier 424.

Turning now to FIGS. 6-9, an example of a three dimensional printing head assembly 520 is shown and will now be described. The three dimensional printing head assembly 520 includes a printing head nozzle 522, a plasma field applicator 532, and a housing 560. More particularly, the printing head nozzle 522 includes a first end or tip 524, a second end or feed end 526, and a feedstock bore 528. The printing head nozzle 522 is vertically disposed in the housing 560 having the plasma field applicator 532 disposed on the tip 524 of the printing head nozzle 522 coaxially with the printing head nozzle 522.

Figure 9:
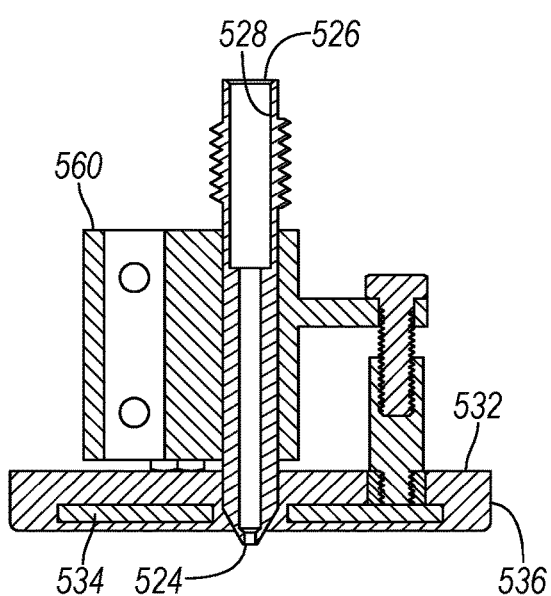
FIG. 9 is a cross-sectional view of a printing head for a three dimensional printing apparatus according to the principles of the present invention.

The plasma field applicator 532 includes a high voltage electrode 534 encapsulated by a dielectric insulator 536 and is best viewed in FIG. 9. The housing 560 includes a number of high voltage wire connectors 562 that provide connectivity between the plasma field applicator 532 and a controller (not shown) or between the printing head nozzle 522 and the ground.

The description of the invention is merely exemplary in nature and variations that do not depart from the spirit of the invention are intended to be within the scope of the invention. Such variations are not to be regarded as a departure from the spirit and scope of the invention.

We claim:

1. A three-dimensional printing apparatus for manufacturing a three-dimensional object, the apparatus comprising:
   a controller having a signal generator;
   a three-dimensional printer having a print head, a part carrier, and a plasma field applicator, the print head including a print head nozzle, and wherein the plasma field applicator is disposed on an end of the print head, the print head nozzle is grounded, the controller is in communication with the print head, part carrier, and plasma field applicator, and the three-dimensional printer builds the three-dimensional object onto the part carrier; and
   wherein the signal generator outputs a signal to the plasma field applicator and the plasma field applicator generates an electromagnetic field and induced current pathway incident to the three-dimensional object on the part carrier;
   wherein the plasma field applicator comprises a voltage electrode and a dielectric insulator, and the voltage electrode is encapsulated by the dielectric insulator;
   wherein the dielectric insulator is a single-piece body comprising a disc with an outer annular surface that faces radially outward in a direction away from the electrode.

2. The three-dimensional printing apparatus of claim 1 wherein the signal to the plasma field applicator comprises a potential electromagnetic signal.

3. The three-dimensional printing apparatus of claim 2 wherein the potential electromagnetic signal comprises an alternating current signal having a frequency between approximately 10 kHz and 100 kHz.

4. The three-dimensional printing apparatus of claim 2 wherein the potential electromagnetic signal comprises one of a continuous wave signal, a square wave signal, a triangle wave signal, a short duration pulse signal, and a rectified signal.

5. The three-dimensional printing apparatus of claim 1 wherein the voltage electrode of the plasma field applicator is connected to the signal generator and the part carrier is grounded.

6. The three-dimensional printing apparatus of claim 5 wherein the plasma field applicator has a disc-like shape.

7. The three-dimensional printing apparatus of claim 1 wherein the print head is a pass through continuous feed stock print head nozzle.

8. The three-dimensional printing apparatus of claim 1 wherein the print head is a screw-type extrusion print head nozzle.

9. The three-dimensional printing apparatus of claim 1 wherein the print head includes a powder compaction roller.

10. A three-dimensional printing apparatus for manufacturing a three-dimensional object, the apparatus comprising:
    a controller having a signal generator;
    a three-dimensional printer having a print head, a part carrier, and a plasma field applicator, the print head including a print head nozzle, and wherein the plasma field applicator is disposed on an end of the print head, the print head nozzle is grounded, the controller is in communication with the print head, part carrier, and plasma field applicator, the plasma field applicator has a disc-like shape, and the three-dimensional printer builds the three-dimensional object onto the part carrier; and
    wherein the signal generator outputs a potential electromagnetic signal to the plasma field applicator and the plasma field applicator generates an electromagnetic field and induced current pathway incident to the three-dimensional object on the part carrier;
    wherein the plasma field applicator comprises a voltage electrode and a dielectric insulator, and the voltage electrode is encapsulated by the dielectric insulator;
    wherein the dielectric insulator is a single-piece body comprising a disc with an outer annular surface that faces radially outward in a direction away from the electrode.

11. The three-dimensional printing apparatus of claim 10 wherein the potential electromagnetic signal comprises an alternating current signal having a frequency between approximately 10 kHz and 100 kHz.

12. The three-dimensional printing apparatus of claim 10 wherein the potential electromagnetic signal comprises one of a continuous wave signal, a square wave signal, a triangle wave signal, a short duration pulse signal, and a rectified signal.

13. The three-dimensional printing apparatus of claim 10 wherein the voltage electrode of the plasma field applicator is connected to the signal generator and the part carrier is grounded.

14. The three-dimensional printing apparatus of claim 13 wherein the print head is a pass through continuous feed stock print head nozzle or a screw-type extrusion print head nozzle.

15. The three-dimensional printing apparatus of claim 13 wherein the print head includes a powder compaction roller.

16. A three-dimensional printing apparatus for manufacturing a three-dimensional object, the apparatus comprising:
a controller having a signal generator;
a three-dimensional printer having a print head, a part carrier, and a plasma field applicator, and wherein the plasma field applicator is disposed on an end of the print head, the controller is in communication with the print head, part carrier, and plasma field applicator, the plasma field applicator has a disc-like shape, the three-dimensional printer builds the three-dimensional object onto the part carrier, and the print head includes a print head nozzle that is a pass through continuous feed stock print head nozzle or a screw-type extrusion print head nozzle; and
wherein the signal generator outputs a potential electromagnetic signal having a frequency between approximately 10 kHz and 100 kHz to the plasma field applicator and the plasma field applicator generates an electromagnetic field and induced current pathway incident to the three-dimensional object on the part carrier;
wherein the plasma field applicator comprises a voltage electrode and a dielectric insulator, and the voltage electrode is encapsulated by the dielectric insulator;
wherein the dielectric insulator is a single-piece body comprising a disk with an outer annular surface that faces radially outward in a direction away from the electrode.

17. The three-dimensional printing apparatus of claim 16 wherein the potential electromagnetic signal comprises one of an alternating current signal, a continuous wave signal, a square wave signal, a triangle wave signal, a short duration pulse signal, and a rectified signal.

* * * * *